United States Patent [19]

Henkel et al.

[11] Patent Number: 4,458,044

[45] Date of Patent: Jul. 3, 1984

[54] ELECTRICAL INSULATION II

[75] Inventors: Hans-Joachim Henkel, Norbert Muller, both of Erlangen, Fed. Rep. of Germany

[73] Assignee: Siemens Aktiengesellschaft, Munich, Fed. Rep. of Germany

[21] Appl. No.: 461,554

[22] Filed: Jan. 27, 1983

[30] Foreign Application Priority Data

Jan. 29, 1982 [DE] Fed. Rep. of Germany ....... 3202828

[51] Int. Cl.$^3$ .............................................. C08K 5/34
[52] U.S. Cl. ..................................... 524/100; 524/101
[58] Field of Search ................ 524/100, 101; 525/481, 525/123

[56] References Cited

U.S. PATENT DOCUMENTS 4,185,007  1/1980  Rasberger et al. .................. 524/101
4,282,333  8/1981  Irie et al. ................................. 525/6

Primary Examiner—John Kight, III
Assistant Examiner—Kriellion Morgan
Attorney, Agent, or Firm—Kenyon & Kenyon

[57] ABSTRACT

The invention relates to electrical insulation material of a polyolefin composition containing an additive which prevents the formation of so-called water trees. Barbituric acid compounds are the additives and include barbituric acid, 2-thiobarbituric acid or substituted barbituric or thiobarbituric acid derivatives. The electrical insulation according to the invention is suited particularly for use in cables and wires.

4 Claims, No Drawings

ELECTRICAL INSULATION II

BACKGROUND OF THE INVENTION

The invention relates to material for electrical insulation which is made of a polyolefin composition with additives for preventing the formation of water trees. It is useful as insulation material especially in cables and wires for medium and high voltage such as about 10 kV and higher.

In electrically stressed polyolefin insulation, phenomenon can occur which is called "electrochemical treeing" (ECT) or "water treeing". This phenomenon, which is of importance particularly for the operating safety of plastic-insulated medium-and high-voltage cables, leads to the formation of tree-like structures in the insulation material, the so-called ECT structures.

The visual appearance of ECT structures which, after suitable staining are visible with particular contrast and detail, vary in size and extent. Basically, two forms can be distinguished:

"vented trees" which start at the surface of the insulation and extend into the insulation, and "bow-tie trees" which are formed in the interior of the insulation.

The mechanism of the ECT formation has not been clarified at present. However, it is believed that an electric field and the presence of water are required for the formation of the ECT structures; hence, the ECT structures are also called "water trees". The points of initiation of the water trees always seem to be faults such as impurities, aggregated admixtures, cavities, gaps, cracks or boundary surfaces, of which, however, only a part leads to the formation of water trees. From the faults, which cannot be avoided completely in insulation produced on a large technical scale, the tree-like structures extend in the direction of the electric field.

Since ECT structures represent local changes of the insulating material, they can cause damage to the insulation, especially with respect to dielectric strength. Therefore, numerous attempts have been undertaken to prevent the growth of water trees or at least to slow it down.

One of the measures for preventing the formation of water trees is to provide the insulating layer with a metallic coating or jacket, for instance, of lead or aluminum. However, cables with such a water shielding layer are not only more expensive but also heavier and therefore, more difficult to handle than cables without metal jackets.

For this reason, prevention of the formation of ECT structures has been attempted by adding additives to the polymer of the insulating layer (or adjacent layers). Of the many compounds used in this connection, the following are exemplary: lead stearate (DE-OS No. 24 25 760 or British Pat. No. 1,473,867), sodium chloride and sulfate or other strong electrolytes (DE-AS No. 25 37 283 or U.S. Pat. No. 4,042,776), salts forming stable hydrates, such as calcium and magnesium chloride, and basic anhydrides (DE-OS No. 28 17 804 or British Pat. No. 1,584,501), silica gel and phosphorus pentoxide (DE-OS No. 27 54 336: page 6, last paragraph), organosilanes (U.S. Pat. Nos. 4,144,202; 4,212,756 and 4,263,158 as well as DE-OS No. 28 05 875 page 3, paragraphs 2 and 3), lead oxides and basic lead compounds (DE-OS No. 25 23 844: claim 1, and DE-OS No. 28 06 752: claims 1 and 3), organic isocyanates (U.S. Pat. No. 4,282,333), silane compounds grafted on the polymer material (DE-OS No. 29 35 224: claim 1) and metal complexes of diketones, salicylic acid or Schiff bases (European Pat. No. A1-27 300).

In contrast with the use of salt-like compounds or electrolytes, it has also been proposed to keep the content of finely distributed water-soluble and/or hygroscopic salts in the insulation below a value of $10^{-1}$ ppm and preferably, below $10^{-4}$ ppm (DE-OS No. 29 11 756: page 3, paragraphs 3 and 4).

These measures, which are not consistent, have not generally produced the desired results. For example, a report by Cigré, the International High-Voltage Conference, of 1980 (see "Kunststoffe" (Plastics) 71, 1981, pages 448 et seq.) recommends that a watertight metal shield be applied to high voltage cables in order to prevent moisture from penetrating.

It is, therefore, an object of the invention to prevent effectively and permanently the formation of water trees in electrical insulation for medium and high voltage from about 10 kV up by use of suitable additives. A further object is to avoid expensive measures such as metal jackets.

SUMMARY OF THE INVENTION

These and other objects are achieved by the invention which is directed to an electrical insulating material made from a polyolefin composition with a barbituric acid compound as an additive. The barbituric acid compound may be barbituric acid, 2-thiobarbituric acid, or a barbituric acid derivative of formula I

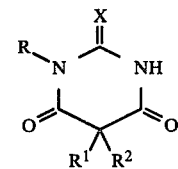

wherein
X is oxygen or sulfur,
R is hydrogen or alkyl, and
$R^1$ and $R^2$ are each independently selected from hydrogen, alkyl, cycloalkyl, alkenyl, cycloalkenyl or aryl.

DETAILED DESCRIPTION OF THE INVENTION

The electrical insulation material according to the invention employs a polyolefin composition with an additive for preventing the formation of water trees. The additive may be barbituric acid or thiobarbituric acid and derivatives of these compounds as shown by Formula I.

Of the derivatives of barbituric acid (see formula I) the following compounds are preferred:

$R^1$ is hydrogen, C-1 to C-18 alkyl (including substituted alkyl radicals such as benzyl, phenethyl and cyclohexylpentyl), C-3 to C-8 alkenyl, C-3 to C-8 cycloalkyl, C-3 to C-8 cycloalkenyl, phenyl or tolyl;

$R^2$ is hydrogen, C-1 to C-5 alkyl (including substituted alkyl radicals such as benzyl), C-3 or C-4 alkenyl or phenyl; and R is hydrogen or C-1 to C-22 alkyl (including substituted alkyl radicals such as benzyl and phenethyl).

Of the derivatives of the thiobarbituric acid, the following compounds are preferred.

$R^1$ is hydrogen, C-1 to C-6 alkyl (including substituted alkyl radicals such as benzyl and phenethyl), C-5 to C-8 cycloalkyl or phenyl;

$R^2$ is hydrogen, C-1 to C-5 alkyl (including substituted alkyl radicals such as benzyl) or phenyl; and R is hydrogen or C-1 to C-6 alkyl (including substituted alkyl radicals such as benzyl).

By way of example, the following compounds are quoted: 5-stearyl barbituric acid, 5,5-diethyl barbituric acid (barbital), 5,5-diallyl barbituric acid (allobarbital), 5-ethyl-5-phenyl barbituric acid (phenobarbital), 5-ethyl-5-(1-cyclohexenyl)-barbituric acid (cyclobarbital), 1-methyl-5-ethyl-5-phenyl barbituric acid (methylphenobarbital) and 1,5-dimethyl-5-(1-cyclohexenyl) barbituric acid (hexobarbital).

Besides cables and wires, the electrical insulation composition according to the invention can also find use in bushings and fittings.

In general, any polyolefin may be used as the composition of the insulator material of the invention, i.e. cross-linked as well as non-cross-linked polyolefins are useful in the invention.

In particular, polyethylene (PE) and cross-linked polyethylene (VPE) find use in the insulation according to the invention. In addition, however, ethylene copolymers such as ethylene-propylene copolymers (EPR), ethylene-vinylacetate copolymers (EVA) and ethylene alkylacrylate copolymers (for instance, ethylene-ethylacrylate and butylacrylate copolymers) as well as ethylene-propylene-diene terpolymers and mixtures (blends) of these ethylene copolymers and terpolymers with polyolefins, especially polyethylene and polyproylene, can be employed. The foregoing polymers and polymer mixtures can be used in a cross-linked as well as a non-cross-linked state. The cross-linking can be accomplished by peroxide or by high-energy radiation.

The additive content is approximately between 0.5 and 5% by weight, relative to the total weight of the electrical insulation. In cables and wires, the barbituric acid compound additives can be added to the insulating layer proper as well as also to the field-confining layers, i.e., to the inner and outer conducting layer. The additives may be present in one or in all layers. The additive content in especially preferred compositions will be approximately between 1 and 2% by weight relative to that of the composition.

The invention will be explained in further detail with the aid of embodiment examples.

EXAMPLE

To demonstrate the reduction of the formation of water trees, sheets 3 mm thick, with and without additive, of a high-purity, unstabilized, low-density thermoplastic polyethylene (LDPE) were made. For preparing insulation according to the invention, barbituric acid or barbituric acid derivatives at varying concentrations were admixed with sheet material samples before they were pressed. The test pieces in sheet form were then stressed electrically with 10 kV/50 Hz while both surfaces were in direct contact with a 3% sodium chloride solution heated to 70° C. The exposure time was 130 hours.

The test results showed that the barbituric acid containing sheet test specimens contain, under equal test conditions, very few ECT structures as compared to the test pieces without the additive. There was also found a considerable difference in the size of the ECT structures. For, while the longitudinal extent of the ECT structures in the direction of the electric field in the specimens without additive was up to 1500 μm, the barbituric acid containing test pieces exhibited, in part, ECT structures under 50 μm.

In detail, the following is obtained for 1% additions of various barbituric acid derivatives.

| Additive | Length of the ECT Structures | Relative Number of the ECT Structures (relative to the reference test) |
|---|---|---|
| (Reference Test) | 1500 μm | — |
| Barbituric Acid | <50 μm | less |
| 2-Thiobarbituric acid | 50 μm | less |
| Barbital | 50 μm | less |
| Phenobarbital | 50 μm | less |
| Hexobarbital | 50 μm | equal |
| 5-Stearyl Barbituric acid | 80 μm | less |
| Methylphenobarbital | 300 μm | equal |

It is thus found that the ECT formation can be reduced considerably even at low barbituric acid concentration. This has the further advantage that the electrical properties of the insulation are not influenced or only insignificantly so. While salts of barbituric acid or the barbituric acid derivatives may also be used to reduce the length of the ECT structures, the reduction is not as extensive as with the additives according to the invention (for instance, sodium barbiturate, 500 μm; and cyclobarbital-calcium, 700 μm).

What is claimed is:

1. An electrical insulation material with an additive for preventing the formation of water trees, which comprises:

a polyolefin composition with a barbituric acid compound additive selected from barbituric acid, 2-thiobarbituric acid or a barbituric acid derivative having the formula:

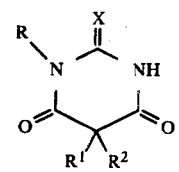

wherein:

X is oxygen or sulfur,

R is hydrogen or alkyl, and $R^1$ and $R^2$ are each independently selected from hydrogen, alkyl alkenyl, cycloalkyl, cycloalkenyl or aryl.

2. An electrical insulation material according to claim 1, wherein the additive content is approximately between 0.5 and 5% by weight, relative to the total weight of the invention.

3. An electrical insulation material according to claim 1, wherein the additive is 5-stearyl barbituric acid, barbital, allobarbital, phenobarbital, cyclobarbital, methylphenobarbital or hexobarbital.

4. An electrical insulation material according to claim 1, which is used to insulate cable or wire carrying a voltage greater than about 10 kV.

* * * * *